(12) United States Patent
Lee

(10) Patent No.: US 9,407,310 B2
(45) Date of Patent: Aug. 2, 2016

(54) PROTECTIVE COVER FOR ELECTRONIC DEVICE

(71) Applicant: Jesse Lee, Brea, CA (US)

(72) Inventor: Jesse Lee, Brea, CA (US)

(73) Assignee: SENYX, INC., Brea, CA (US)

(\*) Notice: Subject to any disclaimer, the term of this patent is extended or adjusted under 35 U.S.C. 154(b) by 0 days.

(21) Appl. No.: 14/336,556

(22) Filed: Jul. 21, 2014

(65) Prior Publication Data

US 2016/0020808 A1   Jan. 21, 2016

(51) Int. Cl.
*H04M 1/05* (2006.01)
*H04B 1/3888* (2015.01)

(52) U.S. Cl.
CPC .................... *H04B 1/3888* (2013.01)

(58) Field of Classification Search
CPC ............... H04M 1/05; H04B 1/3888
See application file for complete search history.

(56) References Cited

U.S. PATENT DOCUMENTS 8,807,333 B1 * 8/2014 Cooper et al. ............. 206/45.23
8,960,421 B1 * 2/2015 Diebel ......................... 206/45.2

* cited by examiner

*Primary Examiner* — David Bilodeau
(74) *Attorney, Agent, or Firm* — LKP Global Law, LLP

(57) ABSTRACT

Some embodiments of the present disclosure include a protective cover for a tablet computer or other electronic device. The protective cover may be a portfolio style case having a front cover, a back cover, and a frame, the portfolio style cover being configure to accept a tablet computer. A protective corner may be positioned within each corner of the frame, the protective corners configured to protect and pad corners of a tablet computer. In embodiments, a hand strap may be positioned on an interior surface of the front cover, such that when the front cover is open, the hand strap is configured to engage with a user's hand. The front cover may include a magnetic closure that activates the tablet's sleep/wake function and may fold backwards, creating a folding view stand, wherein the folding view stand may engage with a slotted tab on the back cover.

8 Claims, 3 Drawing Sheets

PROTECTIVE COVER FOR ELECTRONIC DEVICE

BACKGROUND

The embodiments herein relate generally to accessories for electronic device, and more particularly, to a protective cover for an electronic device, such as a tablet computer.

Electronic devices, such as tablet computers, can be scratched and dropped, causing aesthetic, and sometimes internal software, damage. Conventional protective cases for tablet computers do not offer protection around the corners of the device, thus leaving the corners of the tablet computer exposed to potential damage.

Therefore, what is needed is a protective cover for an electronic device, such as a tablet computer, wherein the protective cover provides a user with a way to safely use and carry the electronic device without the chance of producing damage to the corners of the device.

SUMMARY

Some embodiments of the present disclosure include a protective cover for a tablet computer or other electronic device. The protective cover may be a portfolio style case having a front cover, a back cover, and a frame, the portfolio style cover being configure to accept a tablet computer. A protective corner may be positioned within each corner of the frame, the protective corners configured to protect and pad corners of a tablet computer. In embodiments, a hand strap may be positioned on an interior surface of the front cover, such that when the front cover is open, the hand strap is configured to engage with a user's hand. The front cover may include a magnetic closure that activates the tablet's sleep/wake function and may fold backwards, creating a folding view stand, wherein the folding view stand may engage with a slotted tab on the back cover.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to cover and protect an electronic device, such as a tablet computer, and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Portfolio-Style Case
2. Protective Corners
3. Frame
4. Folding Viewing Stand
5. Hand Strap The various elements of the protective cover for an electronic device of the present disclosure may be related in the following exemplary fashion. It is not intended to limit the scope or nature of the relationships between the various elements and the following examples are presented as illustrative examples only.

Figure 1:
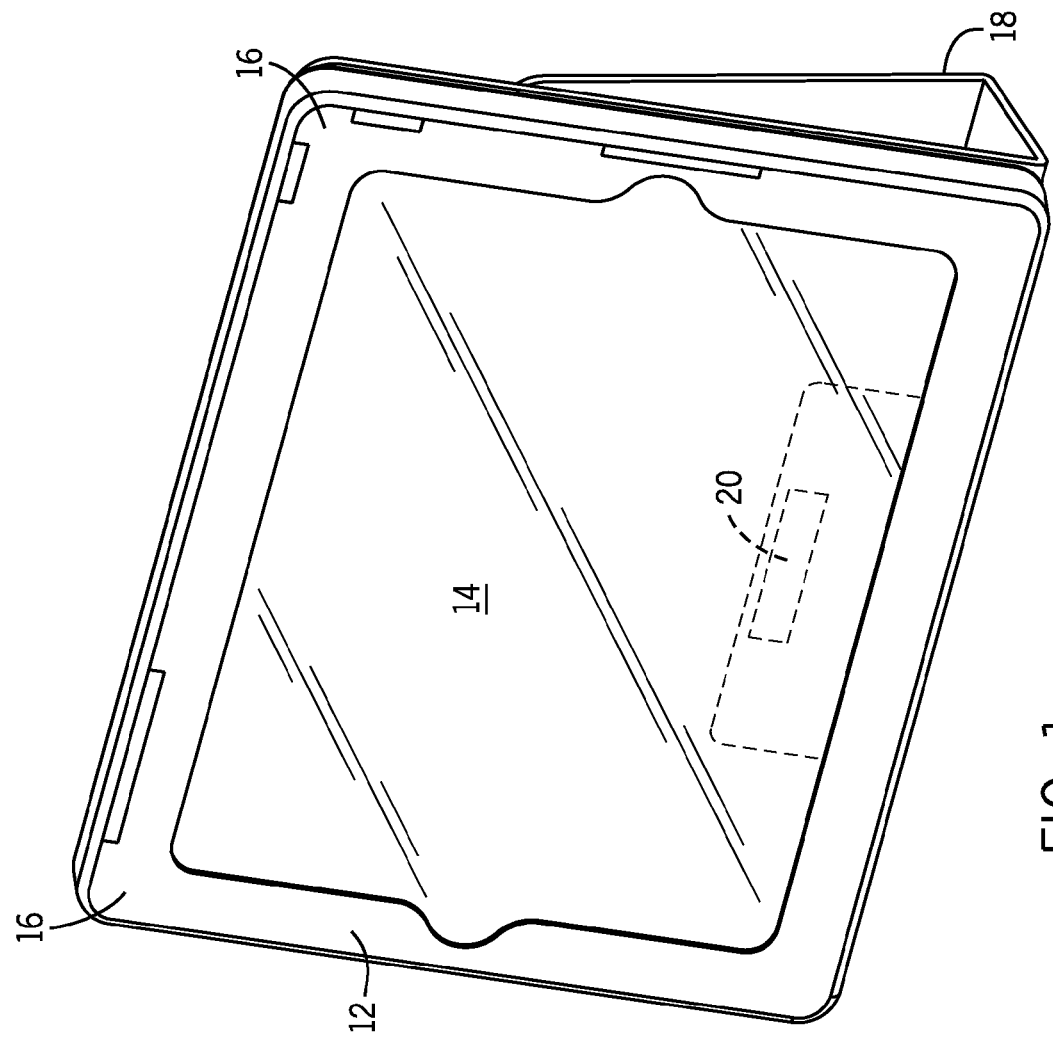
FIG. 1 is a front perspective view of one embodiment of the present invention.
Figure 2:
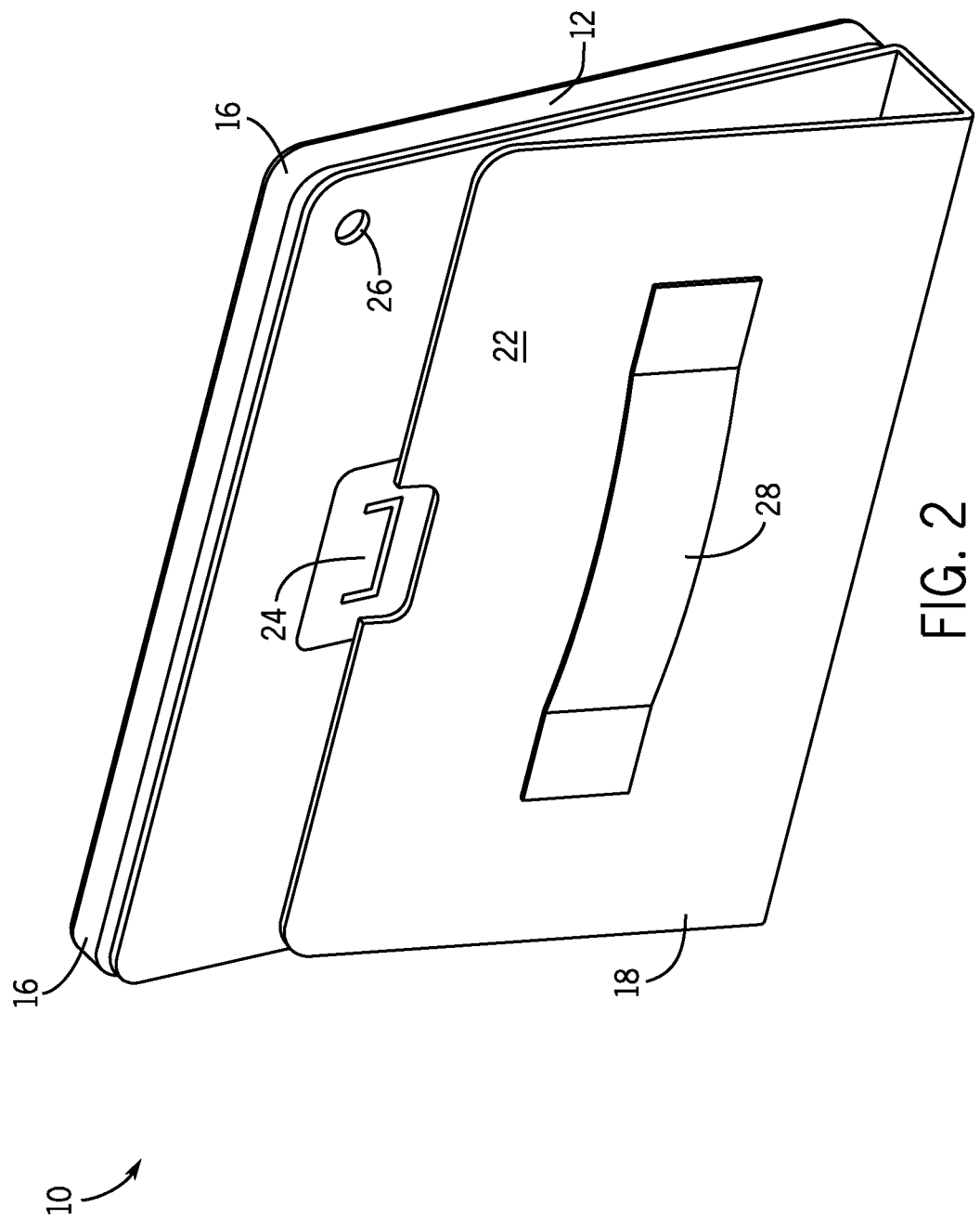
FIG. 2 is a rear perspective view of one embodiment of the present invention.
Figure 3:
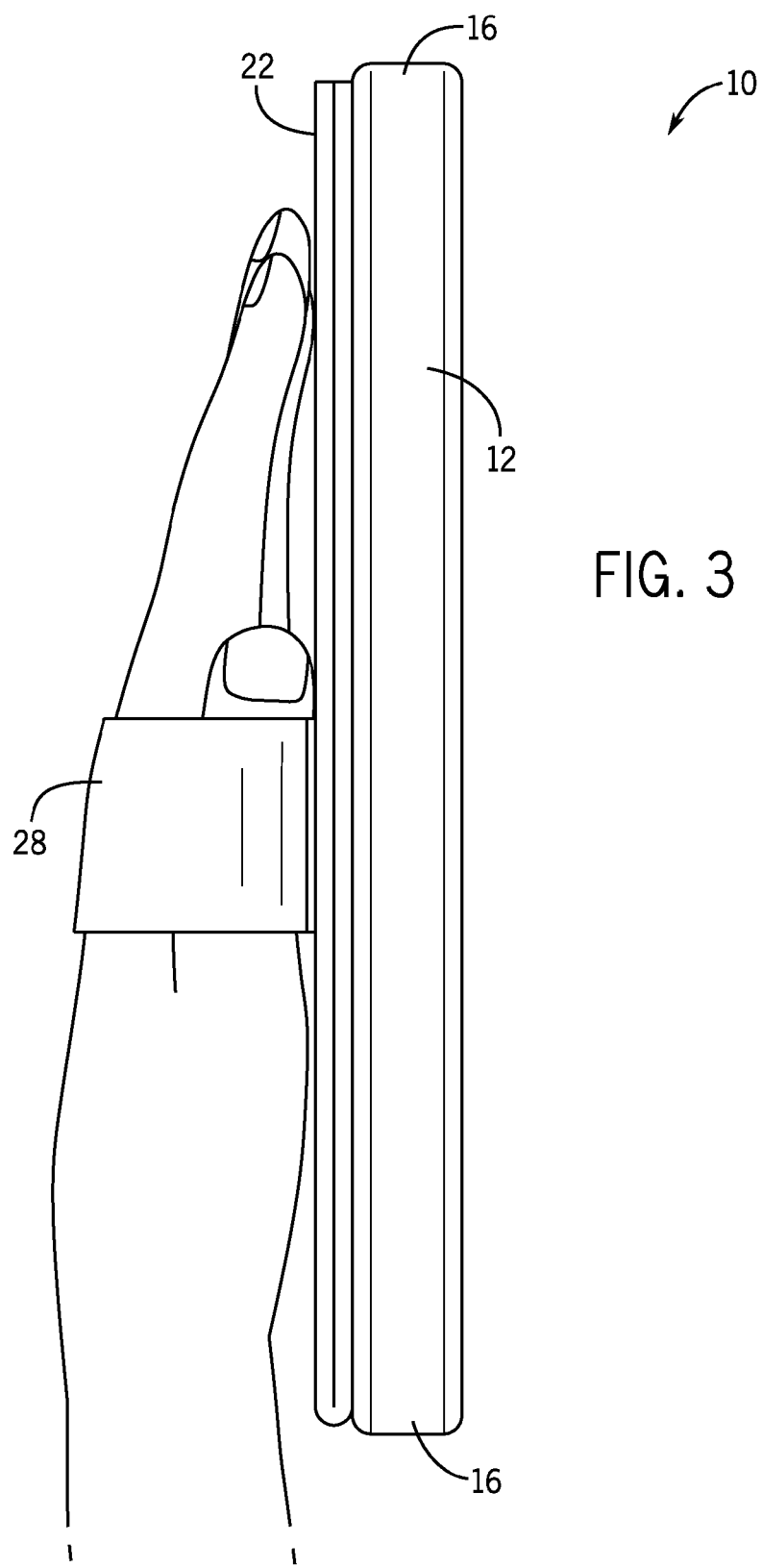
FIG. 3 is a side elevation view of one embodiment of the present invention showing the invention in one mode of use.

By way of example, and referring to FIGS. 1-3, some embodiments of the protective cover for an electronic device of the present disclosure comprise a portfolio style case 10 comprising a frame 12 configured to accept an electronic device, such as a tablet, wherein the frame 12 comprises protective corners 16 configured to protect the corners of the device, and a front cover configured to cover the device display screen 14 when not in use and configured to fold backwards into a folding view stand 18 when the device is in use. As shown in FIG. 1, the frame 12 of the portfolio style case 10 may hold the electronic device securely within the protective cover and may cover the edges and a portion of the front of the electronic device without interfering with the display screen 14 of the device. In some embodiments, the protective cover may further comprise a hand strap 28 attached to the front cover, as shown in FIGS. 2 and 3, such that, when the front cover is folded backwards into the folding view stand 18, a user may slide his or her hand through the hand strap 28 to securely hold the device. The front cover may also comprise a magnetic closure 22, which is configured to hold the front cover of the portfolio style case 10 closed when the device is not in use. In some embodiment, the magnetic closure 22 may also activate the sleep/wake function of a device when the front cover is closed/open, respectively. In yet further embodiments, an interior surface of the protective cover may comprise a fastener 20, such as a hook and loop fastener, configured to help secure the electronic device into the portfolio style cover 10, as shown in FIG. 1, wherein the fastener is configured to engage with a fastener on the back of the electronic device.

As shown in FIG. 2, a back cover of the portfolio style case 10 may comprise a camera lens cutout 26, such that a user can still utilize the camera function of the device while the device is being held in the protective cover. Moreover, the back cover of the portfolio style case 10 may further comprise at least one slotted tab 24 configured to engage with the front cover when it is in a folding view stand 18 configuration, wherein the slotted tab 24 allows the display screen 14 to be viewed at a variety of angles and allows the folding view stand 18 to hold the device in a variety of angles. For example, in some embodiments, the back cover comprises two slotted tabs 24.

The protective cover of the present disclosure may be made using any suitable materials. In some embodiments, the protective corners 16 comprise a foam padding material, such that the frame 12 comprises foam reinforced protective corners 16. The hand strap 28 may comprise any strap material and, in some embodiments, comprises an elastic hand strap.

To use the protective cover of the present disclosure, a user may secure his or her electronic device, such as a tablet computer, into an interior of the portfolio style cover 10, attaching the device to the fastener 20. The frame 12 may also be positioned around the edges of the device with the protective corners 16 securely holding and padding the corners of the device. The user may open the portfolio style case 10 by folding the front cover around to the back of the device, creating a folding viewing stand 18, which may be positioned at any desired angle and held in place with the slotted tab 24. The user may then place the device on a table in a configured shown in FIG. 2, or the user may slip his or her hand through the hand strap 28, as shown in FIG. 3, to securely hold the device. When the user is done using the device, the user may fold the front cover back to the front of the device, wherein a magnetic closure 22 may secure the front cover closed and may also activate the devices sleep or power off mode. In embodiments, using the protective cover correctly may decrease the likelihood of damage occurring to the electronic device.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A protective cover for an electronic device, the protective cover comprising:
    a portfolio style case having a front cover, a hack cover, and a frame;
    a reinforced protective corner positioned within each corner of the frame, the reinforced protective corners configured to protect and pad corners of the electronic device;
    a hand strap positioned on an interior surface of the front cover, such that when the front cover is open, the hand strap is configured to engage with a user's hand; and
    a slotted tab attached to the back cover, the slotted tab having at least one groove configured to engage an edge of the front cover when the front cover is folded backwards in the direction of the back cover.

2. The protective cover of claim 1, wherein the slotted tab is configured to secure the folding view stand at any desired angle.

3. The protective cover of claim 1, wherein the front cover further comprises a magnetic closure configured to secure the front cover shut when the electronic device is not in use.

4. The protective cover of claim 3, wherein the magnetic sure activates the electronic device's sleep/wake function.

5. A protective cover for a tablet computer, the protective cover comprising:
    a portfolio style case having a front cover, a back cover, and a frame, the portfolio style cover being configure to accept a tablet computer;
    a reinforced protective corner positioned within each corner of the frame, the forced protective corners configured to protect and pad corners of a tablet computer; and
    a hand strap positioned on an interior surface of the front cover, such that when the front cover is open, the hand strap is configured to engage with a user's hand,
    wherein:
    the front cover is configured to fold backwards, creating a folding view stand;
    the front cover comprises a magnetic closure configured to secure the front cover shut when the tablet computer is not in use; and
    the back cover comprises a camera lens cutout configured to align with a camera lens on a tablet computer.

6. The protective cover of claim 5, wherein the magnetic closure is configured to activate the tablet computer's sleep/wake function.

7. The protective cover of claim 5, wherein the back cover comprises a slotted tab having at least one groove configured to engage with the folding view standing, allowing the folding view stand to be positioned at any angle desired by the user.

8. The protective cover of claim 5, wherein the protective corners comprise a foam padding.

* * * * *